United States Patent
Chaudhuri et al.

(10) Patent No.: US 9,083,524 B2
(45) Date of Patent: Jul. 14, 2015

(54) SYSTEMS AND METHODS FOR SENDING AN ACKNOWLEDGEMENT MESSAGE IN A WIRELESS COMMUNICATION SYSTEM

(75) Inventors: Arunava Chaudhuri, San Diego, CA (US); Hemanth Sampath, San Diego, CA (US); Raghu N. Challa, San Diego, CA (US); Ravi Palanki, San Diego, CA (US); Sunil K. Kandukuri Narayan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 529 days.

(21) Appl. No.: 12/409,832

(22) Filed: Mar. 24, 2009

(65) Prior Publication Data

US 2009/0245436 A1    Oct. 1, 2009

Related U.S. Application Data

(60) Provisional application No. 61/039,778, filed on Mar. 26, 2008.

(51) Int. Cl.
*H04L 1/20* (2006.01)
*H04L 1/16* (2006.01)

(52) U.S. Cl.
CPC ........ *H04L 1/20* (2013.01); *H04L 1/208* (2013.01); *H04L 1/1607* (2013.01)

(58) Field of Classification Search
USPC .................................. 370/278; 714/748–751
See application file for complete search history.

(56) References Cited

U.S. PATENT DOCUMENTS

| | | | |
|---|---|---|---|
| 6,378,099 B1 * | 4/2002 | Rowitch | 714/748 |
| 6,704,299 B1 * | 3/2004 | Li et al. | 370/332 |
| 7,688,708 B2 * | 3/2010 | Li et al. | 370/203 |
| 7,940,663 B2 | 5/2011 | Kadous | |
| 2003/0086366 A1 | 5/2003 | Branlund et al. | |
| 2004/0148552 A1 | 7/2004 | Matsumoto et al. | |
| 2007/0147253 A1 * | 6/2007 | Sutivong et al. | 370/236 |
| 2007/0274264 A1 | 11/2007 | Jiang | |
| 2008/0101285 A1 * | 5/2008 | Venkatachalam et al. | 370/329 |
| 2009/0264080 A1 * | 10/2009 | Huang et al. | 455/67.13 |

FOREIGN PATENT DOCUMENTS

| | | |
|---|---|---|
| CN | 1431839 A | 7/2003 |
| CN | 1516937 A | 7/2004 |
| CN | 101079814 A | 11/2007 |

(Continued)

OTHER PUBLICATIONS

International Search Report and Written Opinion—PCT/US2009/038209, International Search Authority—European Patent Office—Mar. 15, 2010.

(Continued)

*Primary Examiner* — Ayaz Sheikh
*Assistant Examiner* — Tarell Hampton
(74) *Attorney, Agent, or Firm* — Abdollah Katbab (57) ABSTRACT

A method for sending an acknowledgment message in a wireless communication system is disclosed. A first signal is received before receiving a second signal from a transmitter. Decoded first data is extracted from the first signal. A third signal is produced by encoding and modulating the decoded first data. The second signal is demodulated to produce second symbols. The third signal and the second symbols are correlated.

24 Claims, 10 Drawing Sheets

(56) References Cited

FOREIGN PATENT DOCUMENTS

| EP | 0438463 | A1 | 7/1991 |
| JP | 2002513517 | A | 5/2002 |
| JP | 2008507917 | A | 3/2008 |
| JP | 2011516003 | A | 5/2011 |
| WO | 9800982 | A2 | 1/1998 |
| WO | 2006023192 | A2 | 3/2006 |
| WO | 2006071831 | A2 | 7/2006 |
| WO | WO2007098483 | | 8/2007 |

OTHER PUBLICATIONS

"Taiwan Search Report—TW098109986—TIPO—Jan. 6, 2013."

* cited by examiner

SYSTEMS AND METHODS FOR SENDING AN ACKNOWLEDGEMENT MESSAGE IN A WIRELESS COMMUNICATION SYSTEM

RELATED APPLICATIONS

This application is related to and claims priority from U.S. Provisional Patent Application Ser. No. 61/039,778, filed Mar. 26, 2008, for "Method and System for ACK-to-NACK Detection," with inventors Arunava Chaudhuri, Hemanth Sampath, Raghu N. Challa, Ravi Palanki and Sunil Kumar Kandukuri.

TECHNICAL FIELD

The present disclosure relates generally to communication systems. More specifically, the present disclosure relates to sending an acknowledgment message in a wireless communication system.

BACKGROUND

Wireless communication systems have become an important means by which many people worldwide have come to communicate. A wireless communication system may provide communication for a number of access terminals, each of which may be serviced by an access point.

An access terminal may communicate with one or more access points via transmissions on the uplink and the downlink. The uplink (or reverse link) refers to the communication link from the access terminal to the access point, and the downlink (or forward link) refers to the communication link from the access point to the access terminal.

The resources of a wireless communication system (e.g., bandwidth and transmit power) may be shared among multiple access terminals. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

Benefits may be realized by improved methods and apparatus related to the operation of wireless communication systems.

DETAILED DESCRIPTION

A method for sending an acknowledgment message in a wireless communication system is disclosed. A first signal is received before receiving a second signal from a transmitter. Decoded first data is extracted from the first signal. A third signal is produced by encoding and modulating the decoded first data. The second signal is demodulated to produce second symbols. The third signal and the second symbols are correlated.

An acknowledgment message may also be sent to the transmitter if the decoded first data passes a data check. It may also be determined whether the correlation is above a predefined threshold. The acknowledgment message may be resent to the transmitter if the correlation is above the predefined threshold.

In one configuration, if the correlation is not above the predefined threshold, second symbols may be decoded, a data check may be performed on the decoded second symbols, and a second acknowledgment message may be sent to the transmitter if the decoded second symbols pass the data check. A non-acknowledgment message may be sent if the decoded second symbols do not pass the data check.

The extracting may include demodulating and decoding the first signal. The producing may include scrambling the decoded first data. The correlating may include comparing at least a portion of the third signal to at least a portion of the second symbols. The transmitter may include an access point or an access terminal.

A wireless device for sending an acknowledgment message in a wireless communication system is also disclosed. The wireless device includes a processor and memory in electronic communication with the processor. Executable instructions are stored in the memory. The instructions are executable to receive a first signal before receiving a second signal from a transmitter. The instructions are also executable to extract decoded first data from the first signal. The instructions are also executable to produce a third signal by encoding and modulating the decoded first data. The instructions are also executable to demodulate the second signal to produce second symbols. The instructions are also executable to correlate the third signal with the second symbols.

A wireless device for sending an acknowledgment message in a wireless communication system is also disclosed. The wireless device includes means for receiving a first signal before receiving a second signal from a transmitter. The wireless device also includes means for extracting decoded first data from the first signal. The wireless device also includes means for producing a third signal by encoding and modulating the decoded first data. The wireless device also includes means for demodulating the second signal to produce second symbols. The wireless device also includes means for correlating the third signal with the second symbols.

A computer-program product for sending an acknowledgment message in a wireless communication system is also disclosed. The computer-program product comprises a computer-readable medium having instructions thereon. The instructions include code for receiving a first signal before receiving a second signal from a transmitter. The instructions also include code for extracting decoded first data from the first signal. The instructions also include code for producing a third signal by encoding and modulating the decoded first data. The instructions also include code for demodulating the second signal to produce second symbols. The instructions also include code for correlating the third signal with the second symbols.

Figure 1:
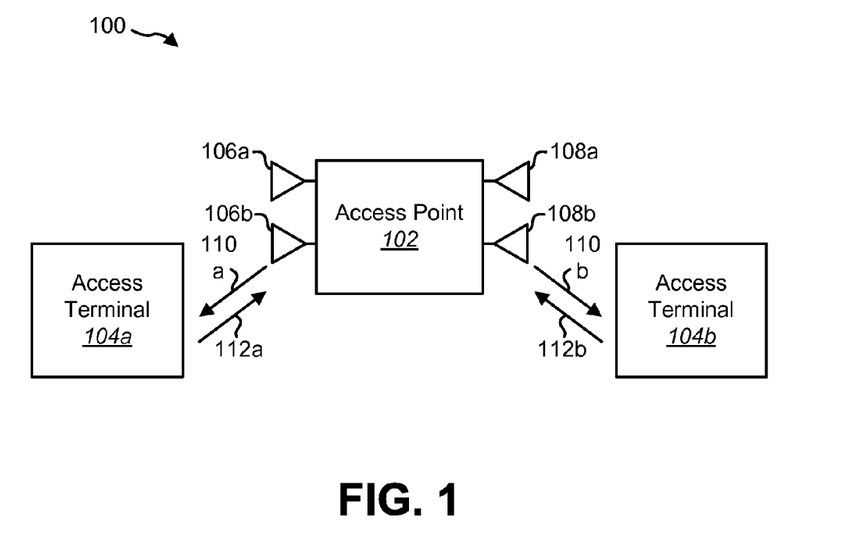
FIG. 1 is a block diagram illustrating a wireless communication system in which the methods disclosed herein may be utilized.

FIG. 1 is a block diagram illustrating a wireless communication system 100 in which the methods disclosed herein may be utilized. The wireless communication system 100 may include one or more access points (AP) 102 that each may include multiple antenna groups. For example, the AP 102 may include two antenna groups, a first group 106 including a first antenna 106a and a second antenna 106b, and a second group 108 including a third antenna 108a and a fourth antenna 108b. While the configuration illustrates each antenna group with two antennas, more or fewer antennas may be included in each antenna group.

The wireless communication system 100 may also include a first access terminal (AT) 104a that communicates with the first antenna group 106, where the first antenna 106a and second antenna 106b transmit information to the first access terminal 104a over a first forward link 110a and receive information from the first access terminal 104a over a first reverse link 112a. Likewise, the wireless communication system 100 may also include a second access terminal (AT) 104b that communicates with the second antenna group 108, where the third antenna 108a and the fourth antenna 108b transmit information to the second access terminal 104b over a second forward link 110b and receive information from the second access terminal 104b over a second reverse link 112b. In the wireless communication system 100, the forward communication links 110 may use different frequencies for communication than the reverse communication links 112.

The system 100 may use Automatic Repeat request (ARQ) or Hybrid ARQ (HARQ) for error control of data transmissions. The AP 102 and the ATs 104 may exchange a series of acknowledgment signals (ACK) or non-acknowledgment signals (NACK) based on received data.

The uplink 112 data channel may be referred to as the Primary Uplink Shared Channel (PUSCH), and the corresponding ACK on the downlink 110 may be referred to as the Primary HARQ Indicator Channel (PHICH). Additionally, the data on the downlink 110 may be referred to as the Primary Downlink Shared Channel (PDSCH) and the corresponding ACK on the uplink 112 may be sent either on the PUSCH or the Primary Uplink Control Channel (PUCCH).

As used herein, the term "access terminal" refers to an electronic device that may be used for voice and/or data communication over a wireless communication system. Examples of access terminals 104 include cellular phones, personal digital assistants (PDAs), handheld devices, wireless modems, laptop computers, personal computers, etc. An access terminal 104 may alternatively be referred to as a subscriber station, a mobile terminal, a mobile station, a remote station, a user terminal, a terminal, a subscriber unit, a mobile device, a wireless device, user equipment (UE), or some other similar terminology. The term "access point" refers to a wireless communication station that is installed at a fixed location and used to communicate with access terminals 104. An access point 102 may alternatively be referred to as a base station, a Node B, an evolved Node B, eNodeB, eNB, or some other similar terminology. Furthermore, the term "transmitter" may refer to any electronic device capable of transmitting data, and may refer to either an AP 102 or an AT 104.

Each group of antennas 106, 108 and/or the area in which they are designed to communicate is often referred to as a sector of the AP 102. In the illustrated configuration, the antenna groups 106, 108 may be designed to communicate to all ATs 104 in a sector. In other words, each antenna group 106, 108 may be responsible for communicating with all of the ATs 104 in a geographic area.

When communicating over the forward links 110, the transmitting antennas may utilize beamforming in order to improve the signal-to-noise ratio in the ATs 104. Additionally, the AP 102 may use beamforming when communicating with ATs 104 scattered randomly throughout its coverage in order to minimize interference.

It should be noted that the wireless communication system 100 may include more than one AP 102 and more or fewer than two ATs 104. Additionally, the AP 102 may communicate using any suitable channel access method, e.g., Frequency Division Multiple Access (FDMA), Code Division Multiple Access (CDMA), Orthogonal Frequency Division Multiple Access (OFDMA), etc.

The system 100 may be a Long Term Evolution (LTE) system according to the $3^{rd}$ Generation Partnership Project (3GPP). Therefore, the system 100 may use asynchronous Hybrid ARQ (HARQ) on the downlinks 110. Each retransmission may be assigned. This may lessen the need for having ACK-to-NACK detection since the ATs 104 may be aware of whether a new packet has started or not. In the system 100 uplink 112, however, synchronous HARQ may be used. Therefore, the present systems and methods may be beneficial at the AP 102. Therefore, although described in conjunction with the ATs 104, the present systems and methods may be used in the AP 102.

Figure 2A:
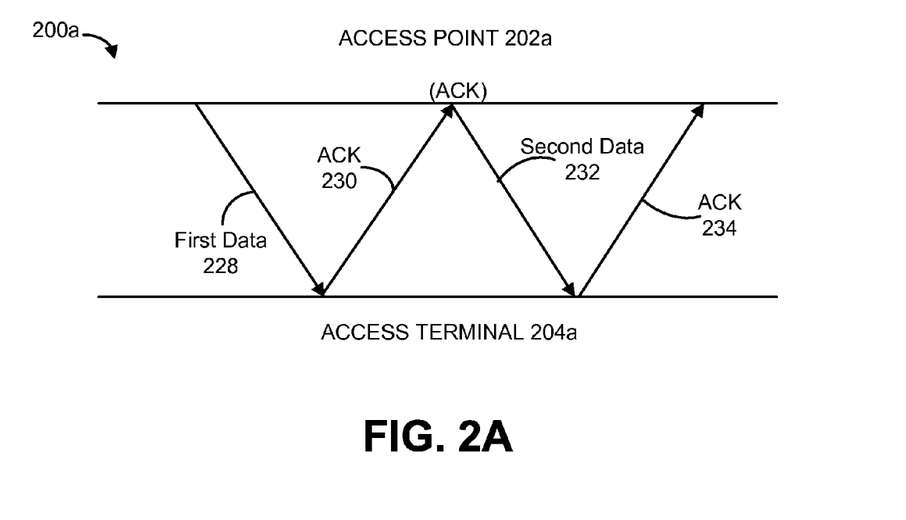
FIG. 2A is a sequence diagram illustrating a system for sending and receiving acknowledgment messages.

FIG. 2A is a sequence diagram 200a illustrating a system for sending and receiving acknowledgment messages. The system may include one or more access points 202a and one or more access terminals 204a and may use Automatic Repeat request (ARQ) or Hybrid ARQ (HARQ) for error control of data transmissions. The AP 202a may send first data 228 to the AT 204a, e.g., a first packet. If successfully received, the AT 204a may respond by sending an acknowledgment message (ACK) 230 to the AP 202a. The ACK 230 may be a message sent by the AT 204a to the AP 202a that indicates that the AT 204a successfully received the first data 228. If the ACK 230 is interpreted correctly by the AP 202a, the AP 202a may then send second data 232 to the AT 204a, e.g., a second packet. If the AT 204a successfully receives the second data 232, the AT 204a may send another ACK 234 to the AP 202a. This process may be repeated for every successful data transmission from the AP 202a to the AT 204a, e.g., packet transmission.

Figure 2B:
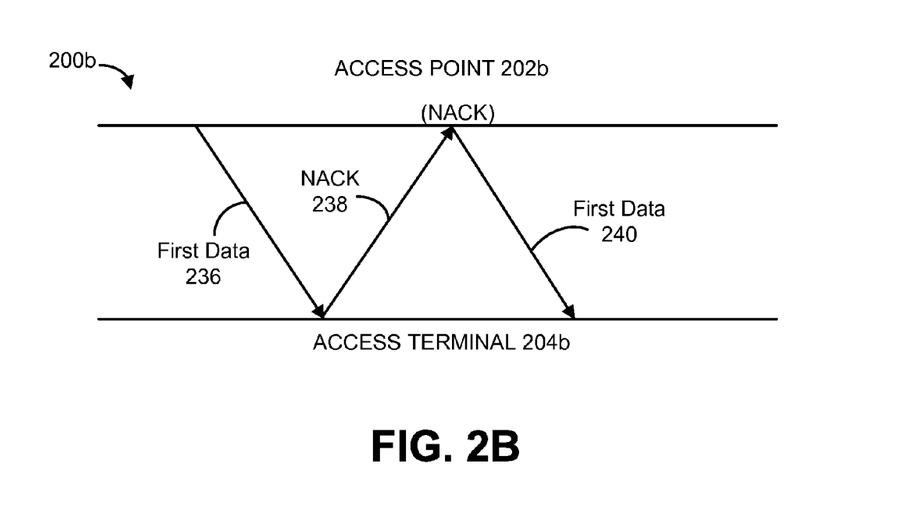
FIG. 2B is another sequence diagram illustrating a system for sending and receiving acknowledgment messages.

FIG. 2B is another sequence diagram 200b illustrating a system for sending and receiving acknowledgment messages. The system may also use ARQ or HARQ for error control of data transmissions. As before, the AP 202b may send first data 236 to the AT 204b, e.g., a first packet. Here, however, the AT 204b may not successfully receive the first data 236. In such a case, the AT 204b may respond by sending a non-acknowledgment message (NACK) 238 to the AP 202b. The NACK 238 may be a message sent by the AT 204b to the AP 202b that indicates that the AT 204b did not successfully receive the first data 236. Upon receiving the NACK 238, the AP 202b may then resend the first data 240 to the AT 204b. Alternatively, if the system uses HARQ, the AP 202b may send the next increment of the same data packet included in the first data 236. The first data 240 may be resent a predetermined number of times or until an ACK 230 is received in response to the first data 236 being sent.

In operation, however, the systems of FIGS. 2A and 2B may potentially encounter a problem. Specifically, if the ACK 230 sent by the AT 204a is erroneously decoded at the AP 202a as a NACK 238, the AP 202a may retransmit the same first data 228 again. In the case of HARQ, the AP 202a may send the next increment of the same data packet. In other words, the AP 202a may sometimes incorrectly retransmit the first data 228 again even though it was correctly received by the AT 204a the first time. This may be a waste of network resources. The present systems and methods may detect this problem at the AT 204a, and resend the ACK 230 if the first data 228 was retransmitted despite an ACK 230. In some configurations as shown herein, the ACK 230 may be sent in a reduced amount of time. If the first data 228 is incorrectly resent, the AT 204a may be able to quickly recognize this and resend the ACK 230 with minimal processing of the resent first data 228. This may improve the efficiency of the devices and network, as well as improve the user experience, by quickly resending the ACK 230 so that the second data 232 may then be sent.

Figure 3:
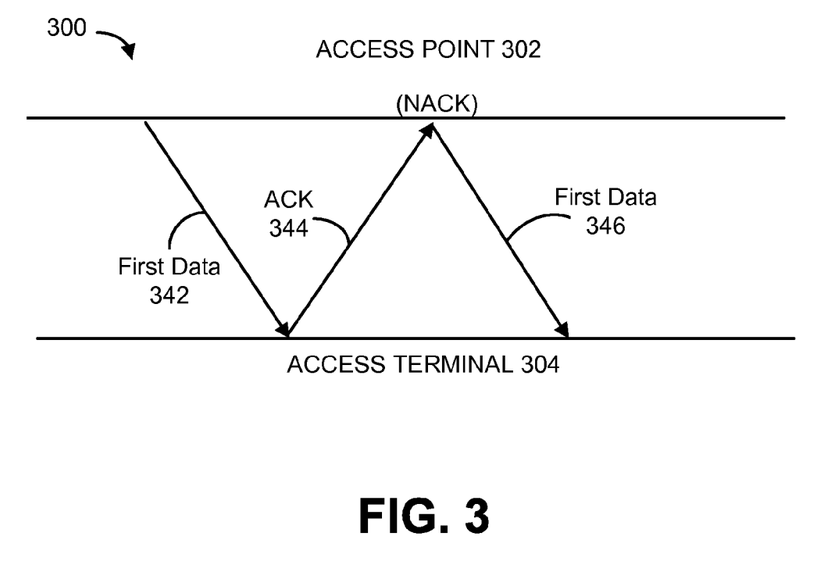
FIG. 3 is a sequence diagram illustrating a system that misinterprets an ACK as a NACK.

FIG. 3 is a sequence diagram 300 illustrating a system that misinterprets an ACK 344 as a NACK. The AP 302 may send first data 342 to an AT 304. If successfully received, the AT 304 may respond by sending an ACK 344 to the AP 302. However, the AP 302 may incorrectly interpret the ACK 344 as a NACK due to signal degradation or other corruption from the AT 304 to the AP 302, or from any number of other causes. Based on the perceived NACK, the AP 302 may then resend the first data 346 back to the AT 304. Alternatively, in the case of HARQ, the AP 302 may send the next increment of the same data packet. This false NACK error exchange may continue and deadlock both the AP 302 and the AT 304.

Figure 4:
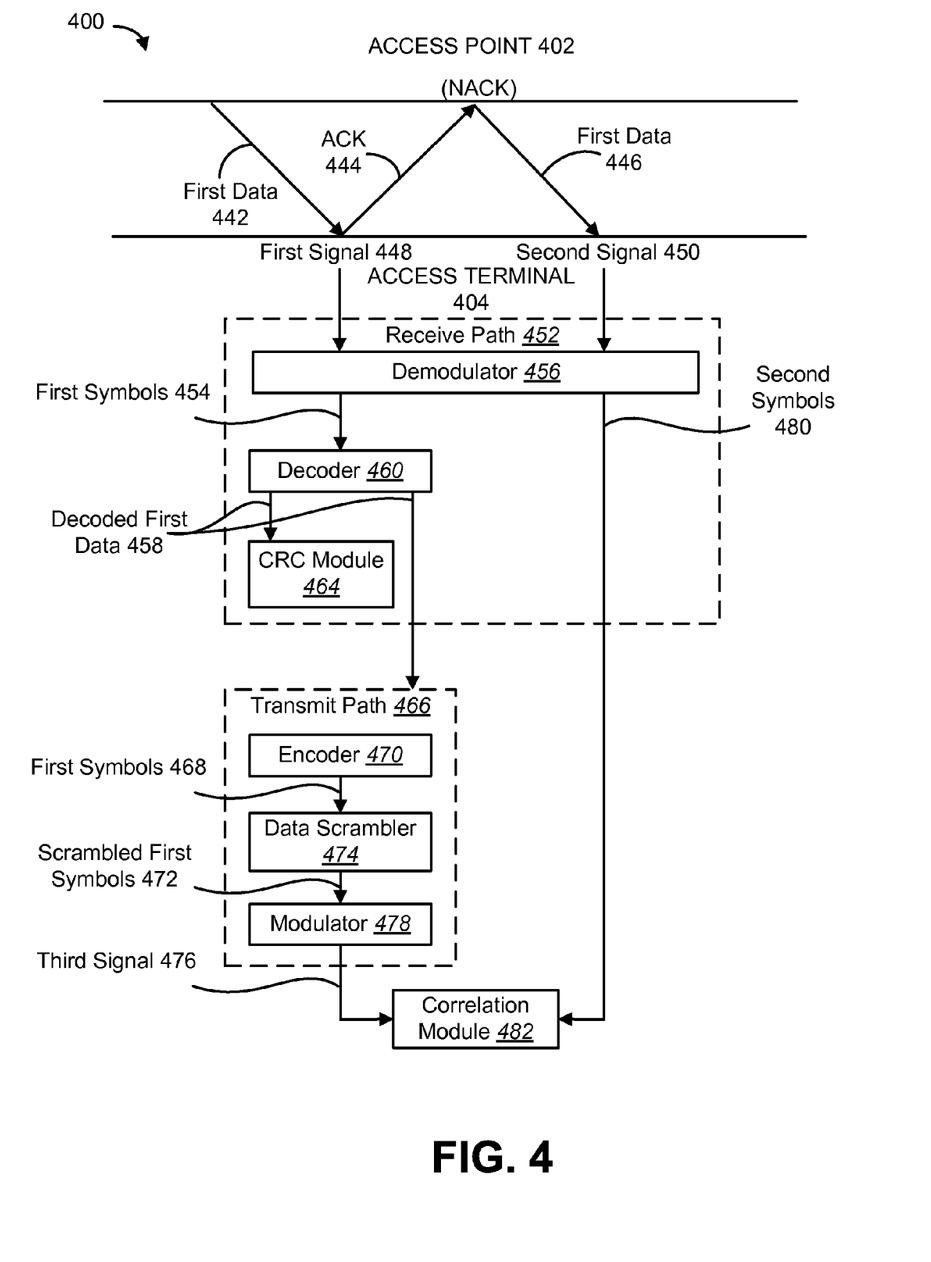
FIG. 4 is a block diagram illustrating a system for sending an acknowledgment message in a wireless communication system.

FIG. 4 is a block diagram illustrating a system 400 for sending an acknowledgment message in a wireless communication system. The sequence diagram at the top of FIG. 4 may be similar to the sequence diagram 300 of FIG. 3, i.e., the AP 402 sends first data 442, misinterprets the ACK 444 as a NACK, and re-sends the first data 446. In FIG. 4, the AT 404 is illustrated as receiving signals from the AP 402 and sending ACKs or NACKs back to the AP 402. However, the present systems and methods are equally applicable when the AP 402 receives signals from the AT 404 and sends ACKs or NACKs back to the AT 404.

The block diagram at the bottom of FIG. 4 illustrates the processing performed by the AT 404 on the received data. The AT 404 may receive the first data 442 as a first signal 448. The first signal 448 may be processed by a receive path 452 that may include a demodulator 456, a decoder 460 and a cyclic redundancy check (CRC) module 464. The first signal 448 may be demodulated into first symbols 454 by the demodulator 456. The demodulator 456 may use any suitable technique, which may correspond to the technique used to modulate the first signal 448, e.g., Quadrature Amplitude Modulation (QAM), Quadrature Phase-Shift Keying (QPSK), etc. The first symbols 454 may be decoded into decoded first data 458 by the decoder 460. The decoder 460 may use any suitable technique, which may correspond to the technique used to encode the first signal 448, e.g., Turbo code, Viterbi code, etc. The decoded first data 458 may be checked by the CRC module 464 to determine if there are any errors in the received first signal 448. If there are no errors, the AT 404 may send the ACK 444 to the AP 402. If there are errors, the AT 404 may send a NACK to the AP 402. The processing performed in the receive path 452 may be common for received signals from the AP 402. In other words, all received packets may be demodulated 456, decoded 460, and checked by the CRC module 464 if they are to be used by the AT 404.

Although performing a CRC check is referred to herein, other means of checking data to determine if it has changed or has been altered may be used. The term data check may be a more general term used herein to mean a CRC check or any other method for checking data/signal integrity. Other means that may be used to check the data/signal integrity include, but are not limited to, using a parity code or other block codes.

The decoded data 458 may then be processed by a transmit path 466 that includes an encoder 470, a data scrambler 474, and a modulator 478. The processing performed in the transmit path 466 may not normally be applied to received data, however, it may be applied in the present systems and methods to transform the decoded first data 458 into a state that may usefully be correlated with other received data. In other words, the first signal 448 may be processed into decoded data 458 by the receive path 452 by the time the second signal 450 is received by the AT 404. Thus, the first signal 448 may not be available in a suitable form for correlation with the second signal 450 when the second signal 450 arrives at the AT 404. Therefore, rather than fully processing (i.e., demodulating, decoding, and CRC checking) the second signal 450 as a retransmission of the first signal 448 or as a newly transmitted signal before sending an ACK 444 or NACK to the AP 402, the AT 404 may send the decoded first data 458 through the transmit path 466 to produce a third signal 476. In other words, the present systems and methods may prevent the AT 404 from having to fully process the second signal 450, which may double the receiver (e.g., the AT 404) processing load. The AT 404 may also demodulate the second signal 450 into second symbols 480, and then correlate the third signal 476 with the second symbols 480. In order to produce the third signal 476 from the decoded data 458, the encoder 470 may encode the decoded data into first symbols 468. The data scrambler 474 may scramble the first symbols 468 into scrambled first symbols 472, and the modulator 478 may modulate the scrambled first symbols 472 into the third signal 476. Alternatively, the first symbols 468 may not be scrambled, and instead be modulated directly after encoding. The transmit path 466 processing may be faster and less processor-intensive than waiting for the second symbols 480 to be decoded by the decoder 460 twice.

The third signal 476 and the second symbols 480 may be input to a correlation module 482. The correlation module 482 may use any suitable technique to determine the similarity of the third signal 476 and the second symbols 480. In other words, the correlation module 482 may seek to determine if the first signal 448 is the same as the second signal 450 by correlating the third signal 476 with the second symbols 480. The third signal 476 may be a reproduction of the first signal 448. If they are the same, this may indicate that the AP 402 is not correctly receiving the ACK 444, and there is no need to decode the second signal 450 since the first signal 448 is identical and has already been processed. Thus, by correlating the third signal 476 and the second symbols 480, the AT 404 may be able to avoid unnecessarily decoding the second signal 450, which may save battery power, processing time, other resources within the AT 404. The correlation module 482 may employ only a limited number of symbols, e.g., correlating the first N symbols in the third signal 476 to the first N symbols in the second symbols 480, as opposed to correlating symbols in the first N tiles, which would use more processing. Additionally, correlating the third signal 476 with the second symbols 480, i.e., modulation level correlation, may use less processing than other types of correlation, e.g., log likelihood ratio (LLR) level correlation.

If the correlation module 482 determines that the first signal 448 is not the same as the second signal 450, the second symbols 480 may then be decoded by the decoder 460 and checked by the CRC module 464. In other words, if the first signal 448 is not the same as the second signal 450 (as determined by correlating the third signal 476 with the second symbols 480), the AP 402 may have correctly received the ACK 444 and sent new data rather than resending old data. Thus, the AT 402 may process the second symbols 480 for use in the AT 402 (e.g., playing on a speaker, displaying on a screen, etc.).

Figure 5:
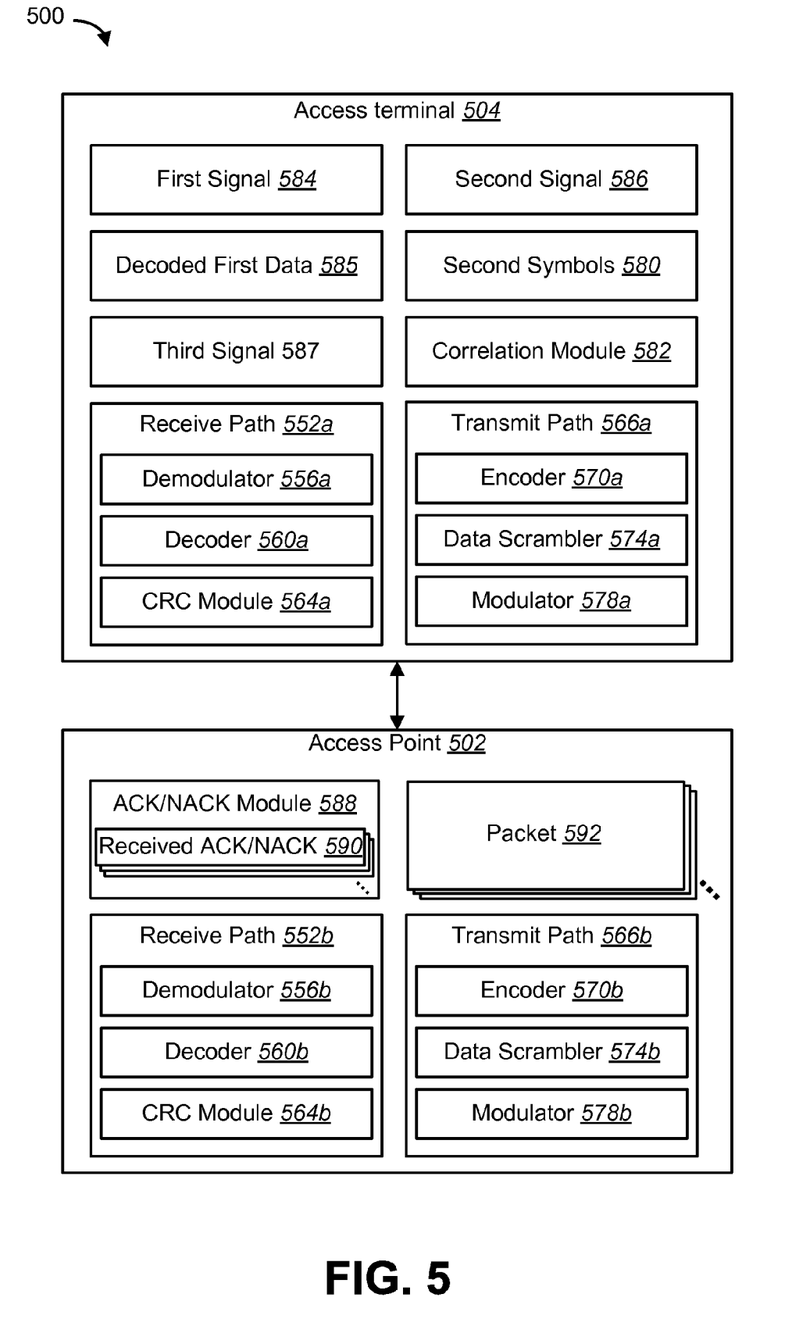
FIG. 5 is another block diagram illustrating a system for sending an acknowledgment message in a wireless communication system.

FIG. 5 is another block diagram illustrating a system 500 for sending an acknowledgment message in a wireless communication system. The system 500 may include an AT 504 and an AP 502. In FIG. 5, the AT 504 is illustrated as receiving signals from the AP 502 and sending ACKs or NACKs back to the AP 502. However, the present systems and methods are equally applicable when the AP 502 receives signals from the AT 504 and sends ACKs or NACKs back to the AT 504.

The AT 504 may communicate with the AP 502 and may use ARQ or HARQ for error control of data transmissions. The AT 504 may include a first signal 584 that may represent the data from the AP 502 in the received form. In other words, the first signal 584 may be data as it was received before any processing by the AT 504. The second signal 586 may be the most recently received data from the AP 502, i.e., received after the first signal 584. By the time the second signal 586 is received by the AT 504, the first signal 584 may have been transformed by the receive path 552a into decoded first data 585, i.e., using the demodulator 556a, decoder 560a, and CRC module 564a. Thus, it may not be possible to use the correlation module 582 to correlate the first signal 584 and the second signal 586 directly.

Instead, the AT 504 may process the decoded first data 585 with the transmit path 566a. Specifically, the encoder 570a may encode the data 585 into symbols, the data scrambler 574a may scramble the symbols, and the modulator 578a may modulate the scrambled signals to provide a third signal 587 that may then be used by the correlation module 582. The third signal 587 may be similar to the first signal 584 before it is processed by the receive path 552a and transmit path 566a. Additionally, the second signal 586 may be demodulated by the demodulator 556a to produce second symbols 580 that may be used by the correlation module 582. Based on the correlation between the third signal 587 and the second symbols 580, the correlation module may send an ACK or a NACK. More specifically, if the third signal 587 is highly correlated to the second symbols 580, this may indicate that the first signal 584 is the same as the second signal 586. Since the AT 504 may have already received the first signal 584, and verified it with the CRC module 564a, the AT 504 may send the ACK for the second signal 586 without decoding or CRC checking. This may save resources in the AT 504 and be quicker than fully processing the second signal 586 in the receive path 552a before sending an ACK or NACK. If, however, there is not sufficient correlation, the second symbols 580 may be further decoded and CRC checked before an ACK or NACK is sent to the AP 502.

The AP 502 may also include a receive path 552b that includes a demodulator 556b, a decoder 560b, and a CRC module 564b. Additionally, the AP 502 may also include a transmit path 566b that includes an encoder 570b, a data scrambler 574b, and a modulator 578b. Further, the AP 502 may also include an ACK/NACK module 588 that may process received ACKs or NACKs 590. Based on the received ACK or NACK 590, the ACK/NACK module 588 may then resend a packet 592 or send another packet 592. In other words, if a NACK is received, the AP 502 may resend a packet 592, using the transmit path 566b, already sent and received at the AT 504. In the case of HARQ, the ACK/NACK module 588 may send the next increment of the same packet 592 in response to a NACK. If an ACK is received, a different packet 592 may be processed by the transmit path 566b and sent to the AT 504.

Figure 6:
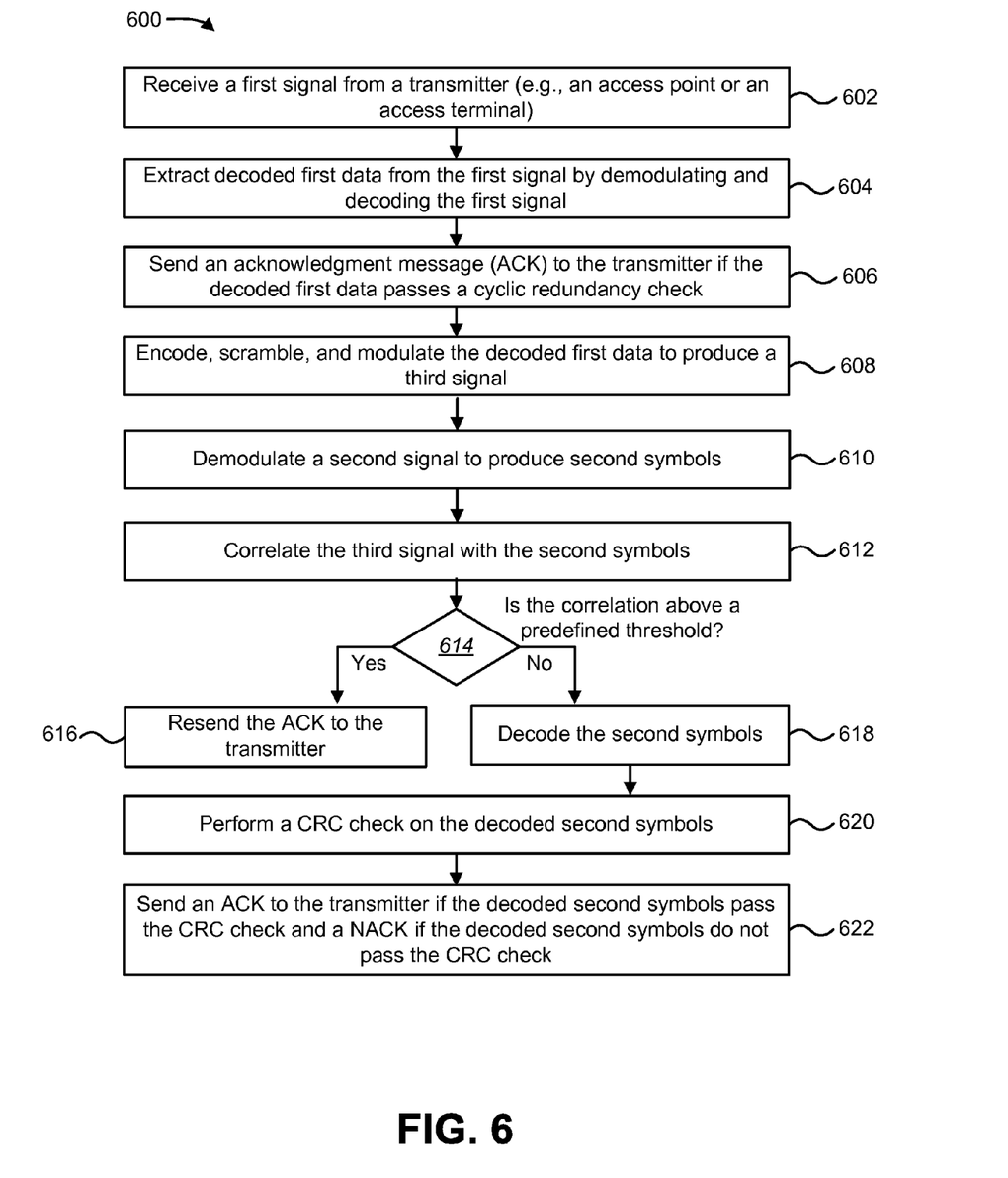
FIG. 6 is a flow diagram illustrating a method for sending an acknowledgment message in a wireless communication system.

FIG. 6 is a flow diagram illustrating a method 600 for sending an acknowledgment message in a wireless communication system. The method 600 may be performed in a wireless device (e.g., an AT 504 or an AP 502) that receives signals from a transmitter (e.g., an AT 504 or an AP 502). In other words, the method 600 may be used in the AT 504 when it receives signals from the AP 502 and/or in the AP 502 when it receives signals from the AT 504. The wireless device may receive 602 a first signal 584 from a transmitter. The wireless device may also extract 604 decoded first data 585 from the first signal 584 by demodulating and decoding the first signal 584. The wireless device may send 606 an ACK to the transmitter if the decoded first data 585 passes a cyclic redundancy check. More generally speaking, the wireless device may send 606 an ACK to the transmitter if the decoded first data 585 passes a data check.

The wireless device may encode, scramble, and modulate 608 the decoded first data 585 to provide a third signal 587. The wireless device may also demodulate 610 a second signal 586 that was received by the wireless device after the first signal 584 to produce second symbols 580. The wireless device may then correlate 612 the third signal 587 with the second symbols 580. If the correlation is above 614 a predefined threshold (e.g., 0.8 or 0.9), the wireless device may resend 616 the ACK to the transmitter. If the correlation is not above 614 a predefined threshold, the wireless device may decode 618 the second symbols 580. The predefined threshold may be set according to system conditions, network conditions, etc. Furthermore, it may be dynamically adjustable by the AT 504 and/or the AP 502.

The wireless device may also perform 620 a CRC check on the decoded second symbols 580. If the decoded second symbols 580 pass the CRC check, the wireless device may send 622 an ACK to the transmitter. If the decoded second symbols 580 do not pass the CRC check, the wireless device may send 622 a NACK to the transmitter.

Figure 6A:
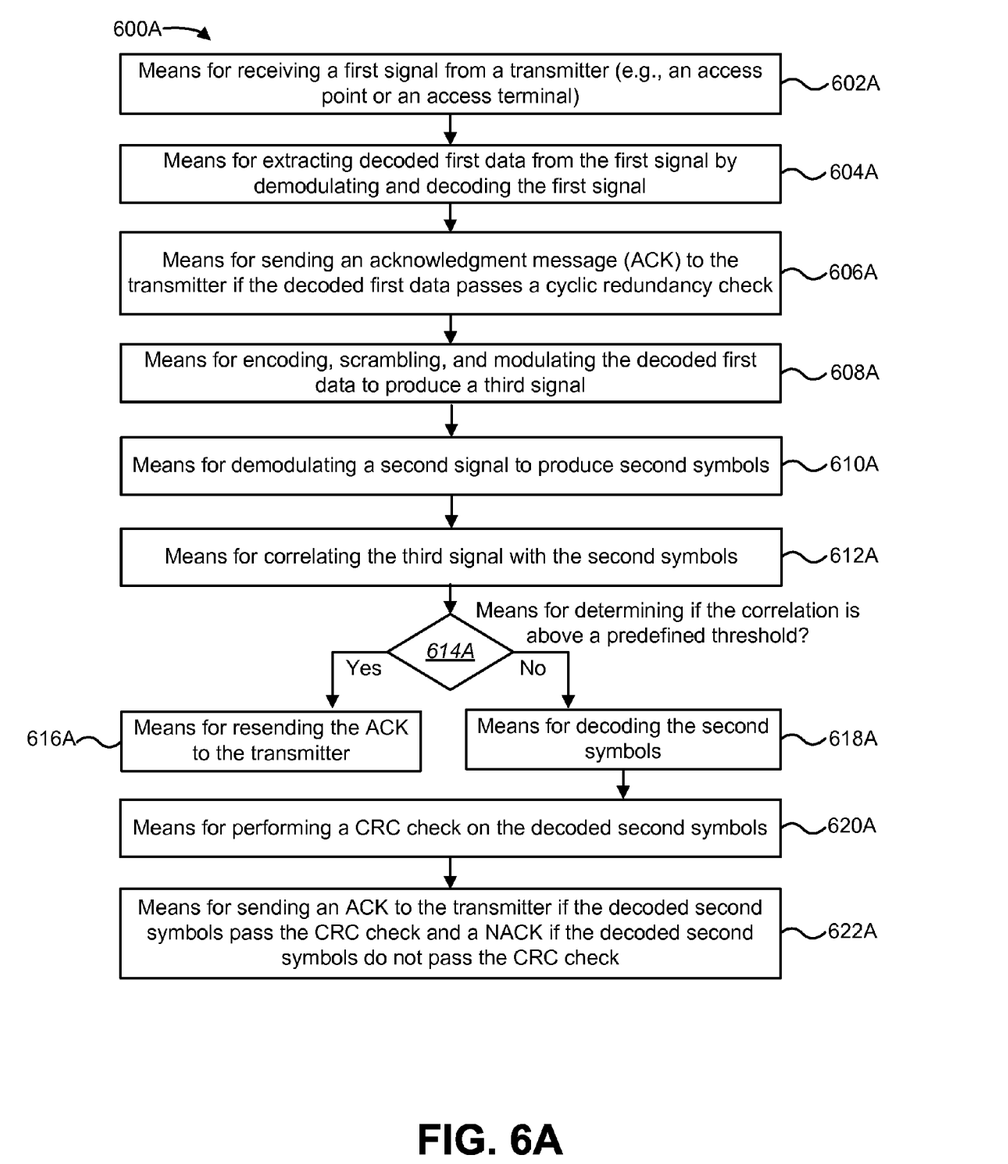
FIG. 6A illustrates means-plus-function blocks corresponding to the method of FIG. 6.

The method 600 of FIG. 6 described above may be performed by various hardware and/or software component(s) and/or module(s) corresponding to the means-plus-function blocks 600A illustrated in FIG. 6A. In other words, blocks 602 through 622 illustrated in FIG. 6 correspond to means-plus-function blocks 602A through 622A illustrated in FIG. 6A.

Figure 7:
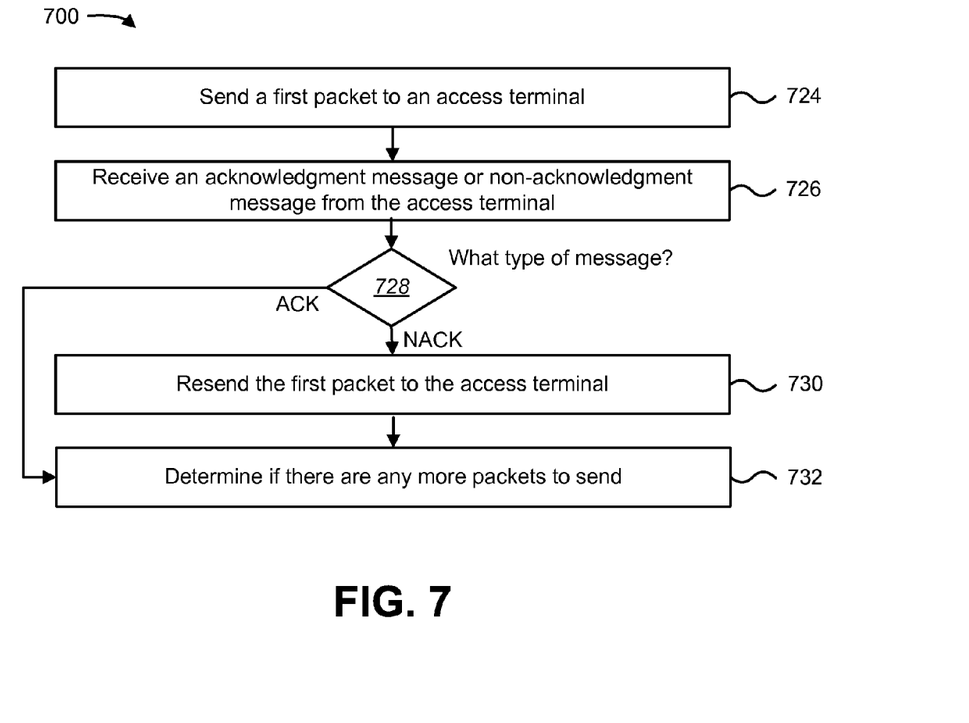
FIG. 7 is a flow diagram illustrating a method for receiving an acknowledgment message in a wireless communication system.

FIG. 7 is a flow diagram illustrating a method 700 for receiving an acknowledgment message in a wireless communication system. The method 700 may be performed by an AP 502. The AP 502 may send 724 a first packet 592 to an AT 504 that may be received as a first signal 584. The AP 502 may also receive 726 an ACK or a NACK from the AT 504. The AP 502 may determine 728 the type of message. If the message is a NACK, the AP 504 may resend 730 the first packet 592 to the AT 504. In the case of HARQ, the AP 502 may send the next increment of the first packet 592 in response to a NACK. If the message is an ACK, the AP 504 may skip the resend 730 step and determine 732 if there are any more packets 592 to send.

Figure 7A:
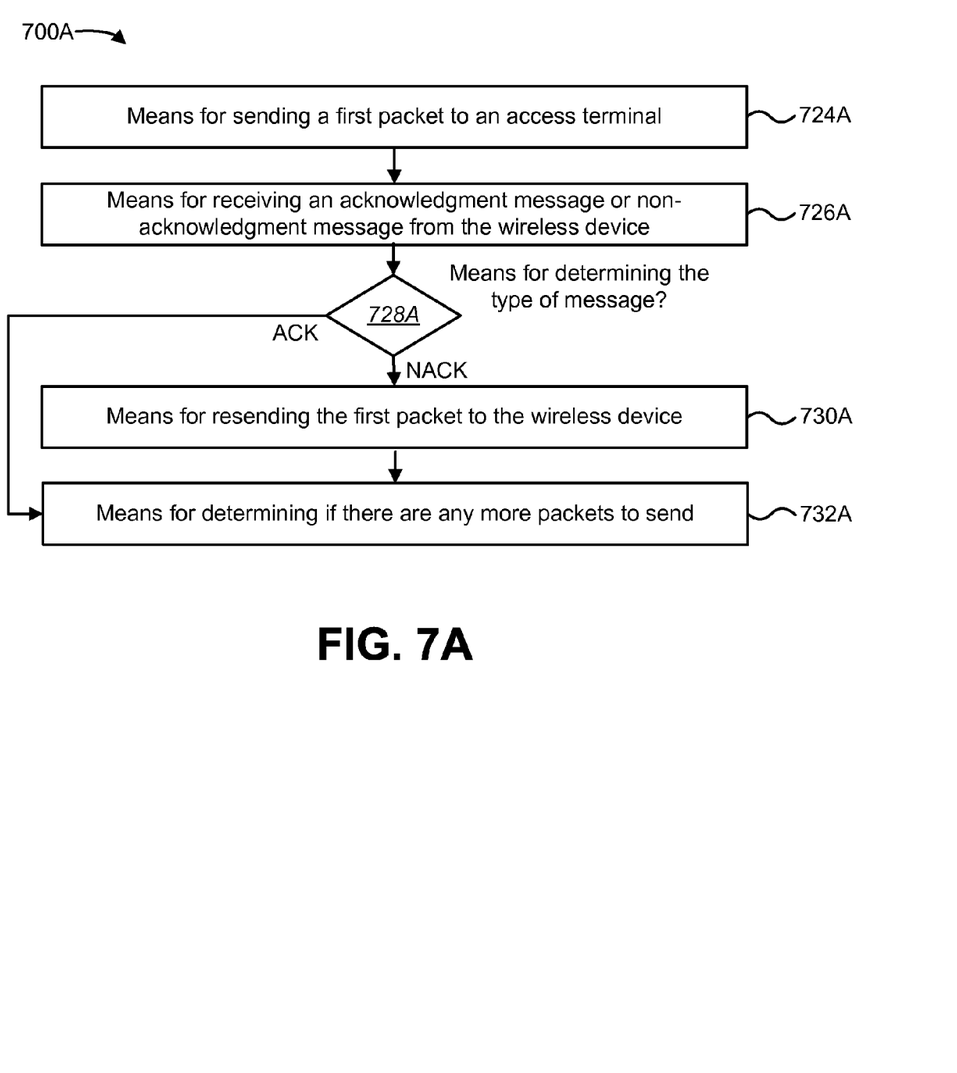
FIG. 7A illustrates means-plus-function blocks corresponding to the method of FIG. 7.

The method 700 of FIG. 7 described above may be performed by various hardware and/or software component(s) and/or module(s) corresponding to the means-plus-function blocks 700A illustrated in FIG. 7. In other words, blocks 724 through 732 illustrated in FIG. 7 correspond to means-plus-function blocks 724A through 732A illustrated in FIG. 7A.

Figure 8:
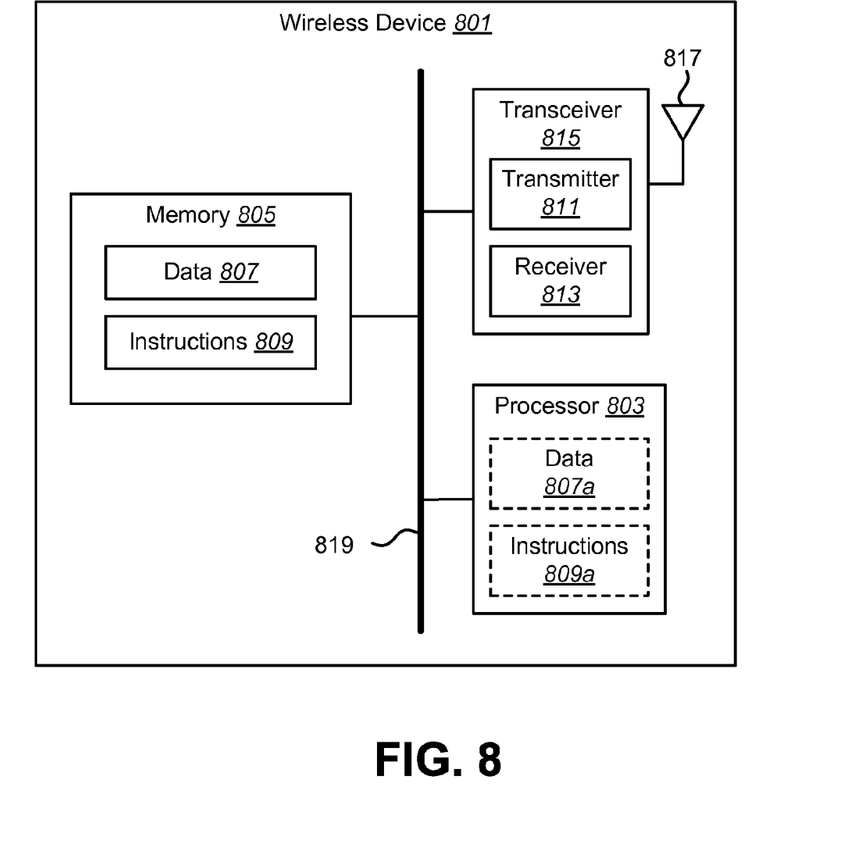
FIG. 8 illustrates certain components that may be included within a wireless device.

FIG. 8 illustrates certain components that may be included within a wireless device 801. The wireless device 801 may be one configuration of an AT 104 (subscriber station) or an AP 102 (base station).

The wireless device 801 includes a processor 803. The processor 803 may be a general purpose single- or multi-chip microprocessor (e.g., an ARM), a special purpose microprocessor (e.g., a digital signal processor (DSP)), a microcontroller, a programmable gate array, etc. The processor 803 may be referred to as a central processing unit (CPU). Although just a single processor 803 is shown in the wireless device 801 of FIG. 8, in an alternative configuration, a combination of processors (e.g., an ARM and DSP) could be used.

The wireless device 801 also includes memory 805. The memory 805 may be any electronic component capable of storing electronic information. The memory 805 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 807 and instructions 809 may be stored in the memory 805. The instructions 809 may be executable by the processor 803 to implement the systems and methods disclosed herein. Executing the instructions 809 by the processor 803 may involve loading portions of the data 807a and the instructions 809a onto the processor 803.

The wireless device 801 may also include a transmitter 811 and a receiver 813 to allow transmission and reception of signals between the wireless device 801 and a remote location. The transmitter 811 and receiver 813 may be collectively referred to as a transceiver 815. An antenna 817 may be electrically coupled to the transceiver 815. The wireless device 801 may also include (not shown) multiple transmitters, multiple receivers, multiple transceivers and/or multiple antenna.

The various components of the wireless device 801 may be coupled together by one or more buses, which may include a power bus, a control signal bus, a status signal bus, a data bus, etc. For the sake of clarity, the various buses are illustrated in FIG. 8 as a bus system 819.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" or "computer-program product" refer to any available medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 6-7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for sending an acknowledgment message in a wireless communication system, comprising:
    receiving a first signal before receiving a second signal from a transmitter;
    extracting decoded first data from the first signal;
    producing a third signal by encoding and modulating the decoded first data;
    sending an acknowledgment message to the transmitter if the decoded first data passes a data check;
    demodulating the second signal to produce second symbols;
    correlating the third signal with the second symbols, wherein the third signal and the second symbols are derived from different signals received at different times;
    determining whether the correlation is above a predefined threshold; and
    if the correlation is not above the predefined threshold:
        decoding the second symbols;
        performing a data check on the decoded second symbols;
        sending a second acknowledgment message to the transmitter if the decoded second symbols pass the data check; and
        sending a non-acknowledgment message if the decoded second symbols do not pass the data check.

2. The method of claim 1, further comprising resending the acknowledgment message to the transmitter if the correlation is above the predefined threshold.

3. The method of claim 1, wherein the extracting comprises demodulating and decoding the first signal.

4. The method of claim 1, wherein the producing further comprises scrambling the decoded first data.

5. The method of claim 1, wherein the correlating comprises comparing at least a portion of the third signal to at least a portion of the second symbols.

6. The method of claim 1, wherein the transmitter comprises an access point.

7. The method of claim 1, wherein the transmitter comprises an access terminal.

8. A wireless device for sending an acknowledgment message in a wireless communication system, comprising:
    a processor;
    memory in electronic communication with the processor;
    instructions stored in the memory, the instructions being executable by the processor to:
        receive a first signal before receiving a second signal from a transmitter;
        extract decoded first data from the first signal;
        send an acknowledgment message to the transmitter if the decoded first data passes a data check;
        produce a third signal by encoding and modulating the decoded first data;
        demodulate the second signal to produce second symbols;
        correlate the third signal with the second symbols, wherein the third signal and the second symbols are derived from different signals received at different times;
        determine whether the correlation is above a predefined threshold; and
        if the correlation is not above the predefined threshold:
            decode the second symbols;
            perform a data check on the decoded second symbols;
            send a second acknowledgment message to the transmitter if the decoded second symbols pass the data check; and
            send a non-acknowledgment message if the decoded second symbols do not pass the data check.

9. The wireless device of claim 8, further comprising instructions executable to resend the acknowledgment message to the transmitter if the correlation is above the predefined threshold.

10. The wireless device of claim 8, wherein the instructions executable to extract comprise instructions executable to demodulate and decode the first signal.

11. The wireless device of claim 8, wherein the instructions executable to produce further comprise instructions executable to scramble the decoded first data.

12. The wireless device of claim 8, wherein the instructions executable to correlate comprise instructions executable to compare at least a portion of the third signal to at least a portion of the second symbols.

13. The wireless device of claim 8, wherein the wireless device is an access point.

14. The wireless device of claim 8, wherein the wireless device is an access terminal.

15. A wireless device for sending an acknowledgment message in a wireless communication system, comprising:
    means for receiving a first signal before receiving a second signal from a transmitter;
    means for extracting decoded first data from the first signal;
    means for sending an acknowledgment message to the transmitter if the decoded first data passes a data check;
    means for producing a third signal by encoding and modulating the decoded first data;
    means for demodulating the second signal to produce second symbols;

means for correlating the third signal with the second symbols, wherein the third signal and the second symbols are derived from different signals received at different times;

means for determining whether the correlation is above a predefined threshold;

means for decoding the second symbols if the correlation is not above the predefined threshold;

means for performing a data check on the decoded second symbols if the correlation is not above the predefined threshold;

means for sending a second acknowledgment message to the transmitter if the decoded second symbols pass the data check and if the correlation is not above the predefined threshold; and means for sending a non-acknowledgment message if the decoded second symbols do not pass the data check and if the correlation is not above the predefined threshold.

16. The wireless device of claim 15, further comprising means for resending the acknowledgment message to the transmitter if the correlation is above the predefined threshold.

17. The wireless device of claim 15, wherein the means for extracting comprises means for demodulating and decoding the first signal.

18. The wireless device of claim 15, wherein the means for producing further comprise means for scrambling the decoded first data.

19. The wireless device of claim 15, wherein the means for correlating comprises means for comparing at least a portion of the third signal to at least a portion of the second symbols.

20. A computer-program product for sending an acknowledgment message in a wireless communication system, the computer-program product comprising a non-transitory computer-readable medium having instructions thereon, the instructions comprising:

code for receiving a first signal before receiving a second signal from a transmitter;

code for extracting decoded first data from the first signal;

code for sending an acknowledgment message to the transmitter if the decoded first data passes a data check;

code for producing a third signal by encoding and modulating the decoded first data;

code for demodulating the second signal to produce second symbols;

code for correlating the third signal with the second symbols, wherein the third signal and the second symbols are derived from different signals received at different times code for determining whether the correlation is above a predefined threshold;

code for decoding the second symbols if the correlation is not above the predefined threshold;

code for performing a data check on the decoded second symbols if the correlation is not above the predefined threshold;

code for sending a second acknowledgment message to the transmitter if the decoded second symbols pass the data check and if the correlation is not above the predefined threshold; and code for sending a non-acknowledgment message if the decoded second symbols do not pass the data check and if the correlation is not above the predefined threshold.

21. The computer-program product of claim 20, further comprising code for resending the acknowledgment message to the transmitter if the correlation is above the predefined threshold.

22. The computer-program product of claim 20, wherein the code for extracting comprises code for demodulating and decoding the first signal.

23. The computer-program product of claim 20, wherein the code for producing further comprises code for scrambling the decoded first data.

24. The computer-program product of claim 20, wherein the code for correlating comprises code for comparing at least a portion of the third signal to at least a portion of the second symbols.

* * * * *